(12) United States Patent                           (10) Patent No.:     US 9,162,544 B2
     Davis                                          (45) Date of Patent:      Oct. 20, 2015

(54) TIRE CHANGING MACHINE WITH BEAD LOOSENER ARM

(71) Applicant: Hennessy Industries, Inc., LaVergne, TN (US)

(72) Inventor: Steven Davis, LaVergne, TN (US)

(73) Assignee: Hennessy Industries, Inc., LaVergne, TN (US)

( * ) Notice: Subject to any disclaimer, the term of this patent is extended or adjusted under 35 U.S.C. 154(b) by 0 days.

(21) Appl. No.: 14/339,356

(22) Filed: Jul. 23, 2014

(65) Prior Publication Data

US 2015/0047789 A1    Feb. 19, 2015

Related U.S. Application Data

(60) Provisional application No. 61/857,392, filed on Jul. 23, 2013.

(51) Int. Cl.
    *B60C 25/14*    (2006.01)
    *B60C 25/13*    (2006.01)

(52) U.S. Cl.
    CPC ............... *B60C 25/14* (2013.01); *B60C 25/13* (2013.01)

(58) Field of Classification Search
    CPC ............................. B60C 25/13; B60C 25/14
    See application file for complete search history.

(56) References Cited

U.S. PATENT DOCUMENTS

| | | |
|---|---|---|
| 2,602,494 A | 7/1952 | Larson |
| 2,672,184 A | 3/1954 | Bergeron |
| 3,008,512 A | 9/1959 | Foster |
| 4,676,291 A | 6/1987 | Bolger |
| D293,916 S | 1/1988 | Cunningham et al. |
| 4,804,030 A | 2/1989 | Mandelko |
| 4,969,498 A | 11/1990 | Sheets |
| 5,050,659 A * | 9/1991 | Scalambra .................. 157/1.24 |
| 5,088,539 A | 2/1992 | Mannen et al. |
| 5,133,236 A | 7/1992 | Dudley |
| 5,381,843 A | 1/1995 | Corghi |
| 5,385,045 A | 1/1995 | Mannen et al. |
| 5,669,429 A | 9/1997 | Gonzaga |
| 6,056,034 A | 5/2000 | Matnick |
| 6,182,736 B1 | 2/2001 | Cunningham et al. |
| 6,276,423 B1 | 8/2001 | Goracy |

(Continued)

FOREIGN PATENT DOCUMENTS

JP         2008024299 A      2/2008

OTHER PUBLICATIONS

International Search Report in corresponding International Application No. PCT/US2014/047911, dated Nov. 7, 2014, 3 pp.

*Primary Examiner* — David B Thomas
(74) *Attorney, Agent, or Firm* — Patterson Intellectual Property Law, P.C.; Mark J. Patterson

(57) ABSTRACT

A wheel servicing machine has a bead loosener arm powered by an actuator attached to a machine base. The actuator includes a moveable actuator rod coupled to the bead loosener arm at a pivoting joint. The pivoting joint includes a joint having two or more angular degrees of freedom, such as a ball joint, in some embodiments. The pivoting joint allows the actuator rod end to pivot both in a major plane of rotation substantially parallel to the movement of the bead loosener arm as well as in one or more minor vertical planes. In some embodiments, the pivoting joint includes a socket positioned around a ball, forming a ball joint. The socket is coupled to the actuator rod, and a pin is disposed through a passage in the ball to pivotally secure the ball joint to the bead loosener arm.

14 Claims, 8 Drawing Sheets

(56) References Cited

U.S. PATENT DOCUMENTS

| | | |
|---|---|---|
| 7,100,660 B2 | 9/2006 | Corghi et al. |
| 7,426,953 B2 | 9/2008 | Baker et al. |
| 7,500,504 B2 | 3/2009 | Bonacini |
| 7,543,622 B1 | 6/2009 | Carpenter et al. |
| 7,591,295 B2 | 9/2009 | Bonacini |
| 7,631,681 B1 | 12/2009 | Petersen |
| 7,743,812 B2 | 6/2010 | Sotgiu |
| 8,408,273 B2 | 4/2013 | Bonacini |
| 8,590,590 B2 * | 11/2013 | du Quesne .................. 157/1.24 |
| 2010/0065224 A1 * | 3/2010 | Ferrari et al. ............... 157/1.17 |
| 2011/0083812 A1 | 4/2011 | du Quesne |

* cited by examiner

TIRE CHANGING MACHINE WITH BEAD LOOSENER ARM

CROSS-REFERENCE TO RELATED APPLICATION

This application claims benefit of and priority to U.S. provisional patent application Ser. No. 61/857,392 filed Jul. 23, 2013 entitled "Tire Changing Machine Bead Loosener Arm with Rotating Knuckle" all of which is hereby incorporated by reference in its entirety.

BACKGROUND

The present invention relates generally to wheel servicing machines. More particularly, this invention pertains to tire changing machines with bead removal arms configured for releasing a bead from its seated position on a wheel rim.

Conventionally, tire changing machines are equipped with a movable arm to engage and loosen the tire bead so that the tire can be removed from the wheel rim. Conventional bead removal arms typically include an arm that pivots relative to a machine base. A shoe is positioned on the arm to engage the tire sidewall to loosen the tire bead from the wheel rim. Conventional bead loosener arms are actuated using an actuator such as a powered pneumatic or hydraulic cylinder. An actuator rod extends from the base to the bead loosener arm.

The actuator rod may connect to the actuator rod at a pivoting joint. A conventional pivoting joint 130 is shown in FIG. 2 and FIG. 3. During use, an operator places a wheel and tire assembly in a space between the shoe 24 and the base 12. The operator controls the powered cylinder to retract the actuator rod 28. The actuator rod 28 extends through a pivot pin 132 on the bead loosener arm 20. The rod also includes a rod retainer 134 on the side of the pivot pin 132 opposite the machine base. During operation, the rod 28 pulls the bead loosener arm 20 toward the base 12, thereby causing the shoe to engage the side wall of the tire to loosen the tire bead.

In some conventional tire changing machines, the actuator rod 28 is slidable through a hole 136 in the pivot pin 132 in the bead loosener arm 20. When the actuator rod 28 is retracted toward the base, the retainer 134 engages the pivot pin 132, limiting the linear travel of the rod 28 relative to the bead loosener arm 20, causing the bead loosener arm 20 to be pulled toward the base in the direction of retraction of the actuator rod 28. As the bead loosener arm 20 is pulled toward the base 12, the shoe 24 eventually engages and depresses the side wall of the tire, causing the bead to be loosened from the wheel rim. After the bead has been loosened, an operator typically controls the powered cylinder to move the rod 28 back toward the bead loosener arm 20 to release the shoe from the tire side wall. This may cause the actuator rod 28 to slide through the hole 136. In such configurations, the user is required to manually pivot the bead loosener arm 20 away from the base.

One problem with conventional wheel servicing machines having bead loosener arms is that the bead loosener arm must be manually pivoted away from the base following a bead loosener operation. This can be burdensome for an operator. Another problem with conventional wheel servicing machines having bead loosener arms is that the actuator rod is coupled to the bead loosener arm at a pivoting joint having a limited range of angular motion. For example, as seen in the conventional embodiment in FIGS. 2-3, when rod 28 is pulled toward base 12, rod 28 is pivotable relative to bead loosener arm 20 in a substantially horizontal plane via the rotation of pivot pin 132 relative to bead loosener arm 20 in one angular direction. However, rod 28 is not pivotable relative to bead loosener arm 20 in any vertical plane. During use, the bead breaker arm 20 may encounter stress in a non-horizontal force vector, causing the bead loosener arm 20 to have a tendency to move in an upward or downward direction other than the substantially horizontal pull direction of rod 28. Such movement of the bead loosener arm puts strain on the actuator rod, the pivoting joint, and the actuator in conventional pivoting joints, such as those shown in FIGS. 2-3. The pivoting joint 130 in such conventional configurations does not allow the actuator rod 28 to pivot in a vertical plane relative to the bead loosener arm 20. Conventional bead loosener arm pivoting joints of this nature also fail to accommodate sag of the bead loosener arm in non-horizontal directions during extended use.

What is needed then are improvements in wheel servicing machines having bead loosener arms.

BRIEF SUMMARY

The present invention provides a wheel servicing machine including a bead loosener arm pivotally attached to a base. The bead loosener arm includes a shoe positioned to engage a sidewall of a tire to loosen a tire bead from its seated position on a wheel rim. The shoe is forced against the sidewall using an actuator on the base that forces the bead loosener arm toward the tire. An actuator rod extends from the actuator and is linked to the bead loosener arm at a pivoting joint. The present invention provides a ball joint at the pivoting joint to allow additional degrees of freedom of angular motion between the actuator rod and the bead loosener arm.

In one aspect, the present invention is a wheel servicing machine having a side-mounted bead loosener arm actuated by an actuator attached to a machine base. The actuator includes an actuator rod coupled to the bead loosener arm at a pivoting joint. The pivoting joint may include a ball joint having three angular degrees of freedom. The pivoting joint allows the actuator rod end to pivot freely both in a major plane of rotation substantially parallel to the movement of the bead loosener arm as well as in minor vertical planes. In some embodiments, the pivoting joint includes a rotatable member, or socket, positioned around a ball. The rotatable member is coupled to the actuator rod, and a pin is disposed vertically through a passage in the ball to secure the ball joint to the bead loosener arm.

In further embodiments, the present invention provides a tire changing machine including a machine base, a support tower extending upwardly from the base, a swing arm pivotally mounted on the support tower, a tire changing tool disposed on the swing arm, a bead loosener arm pivotally mounted on the machine, and an actuator attached to the machine base. The actuator includes an actuator rod having an actuator rod end extending toward the bead loosener arm. A ball joint is disposed between the actuator rod end and the bead loosener arm.

Numerous other objects, advantages and features of the present invention will be readily apparent to those of skill in the art upon a review of the following drawings and description of a preferred embodiment.

DETAILED DESCRIPTION

Figure 1:
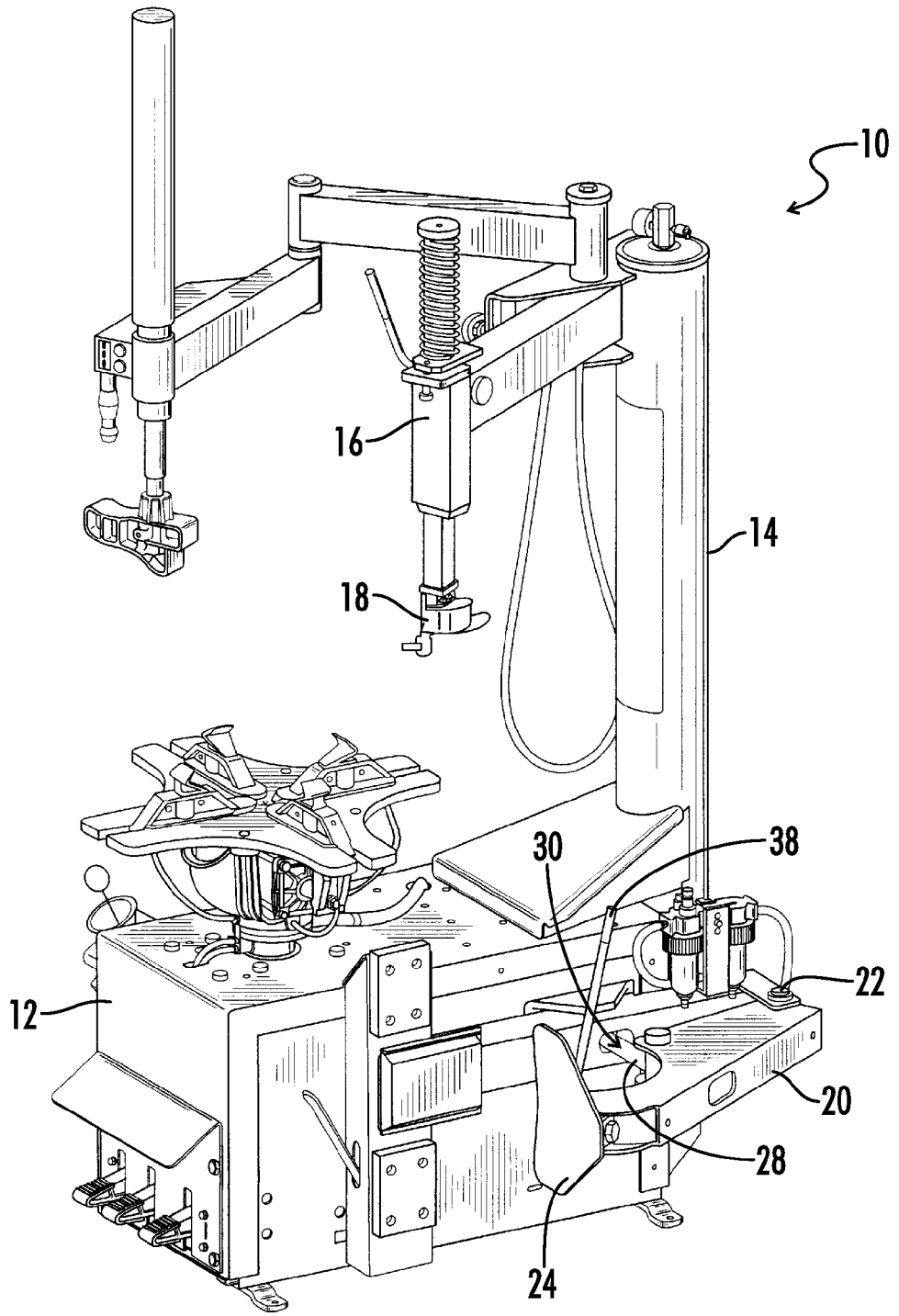
FIG. 1 is a perspective view of an embodiment of a tire changing machine with a bead loosener arm.
Figure 2:
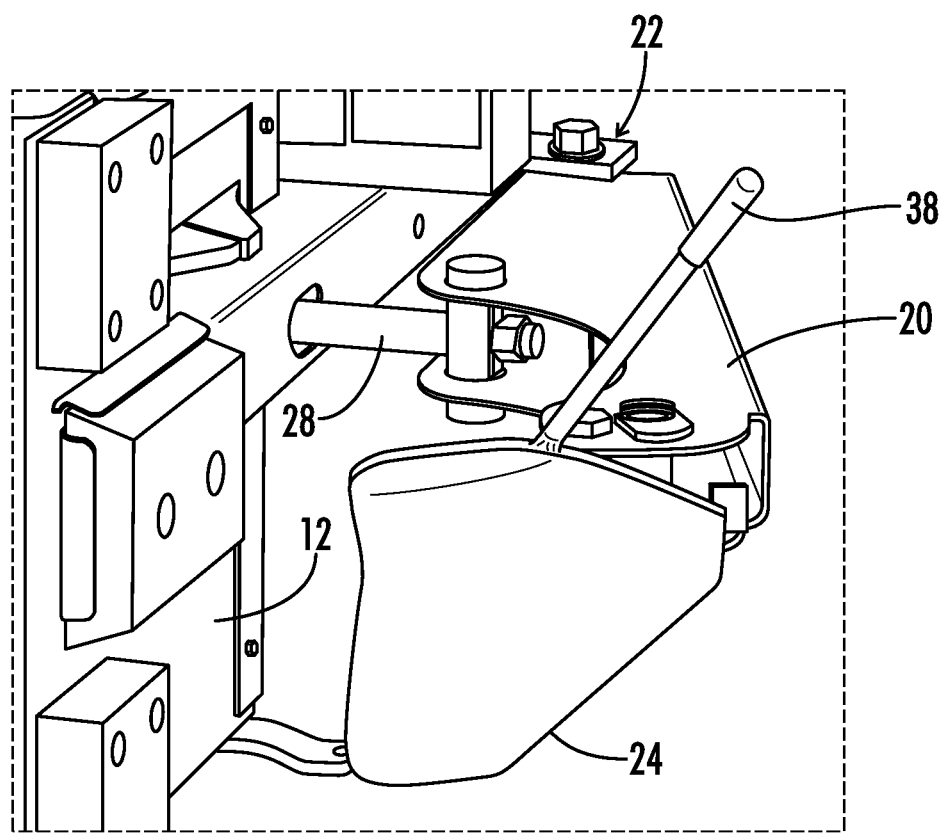
FIG. 2 is a detail perspective view of a tire changing machine with a bead loosener arm having a conventional pivoting joint between the actuator rod and a bead loosener arm.
Figure 3:
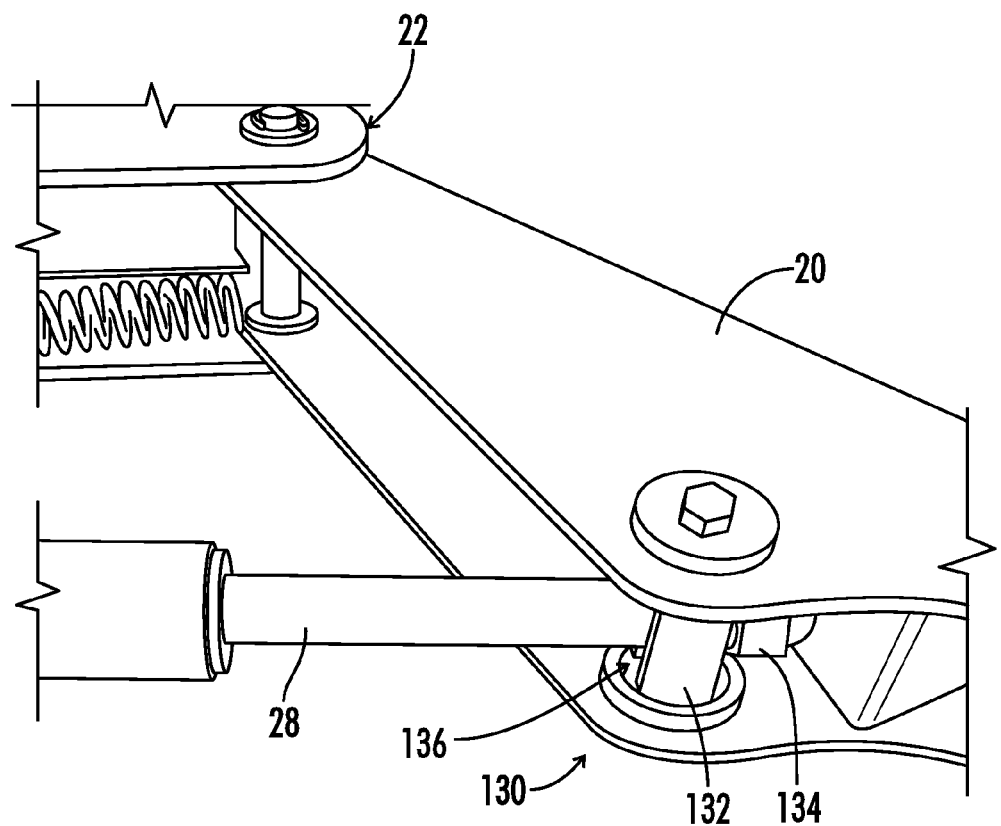
FIG. 3 is a detail perspective view of a conventional pivoting joint between a bead loosener arm and an actuator rod.

Referring now to the drawings, various embodiments of the present invention are generally illustrated. An embodiment of a wheel servicing machine, or tire changing machine 10, is shown in FIG. 1. Tire changing machine 10 includes a base 12, a tower 14 extending upwardly from base 12, a swing arm 16 extending from the tower 14 above the base 12, and a tire changing tool 18 disposed on swing arm 16. Tire changing machine 10 also includes a bead loosener arm 20 pivotally attached to the base 12 at a pivoting arm joint 22. A bead loosener shoe 24 is disposed on the bead loosener arm 20. During use, an operator may position a wheel assembly between shoe 24 and base 12. The wheel assembly generally includes a wheel rim with a tire mounted on the wheel rim. To remove the tire from the wheel rim, the tire bead must be first loosened from its seated position on the wheel rim. Loosener the tire bead from the rim requires application of mechanical force against the tire sidewall near the tire bead. Shoe 24 is shaped and positioned to directly engage the sidewall of a tire when bead loosener arm 20 is moved toward base 12, thereby applying the necessary force to at least partially loosen the tire bead from its seated position on the wheel rim.

Figure 4:
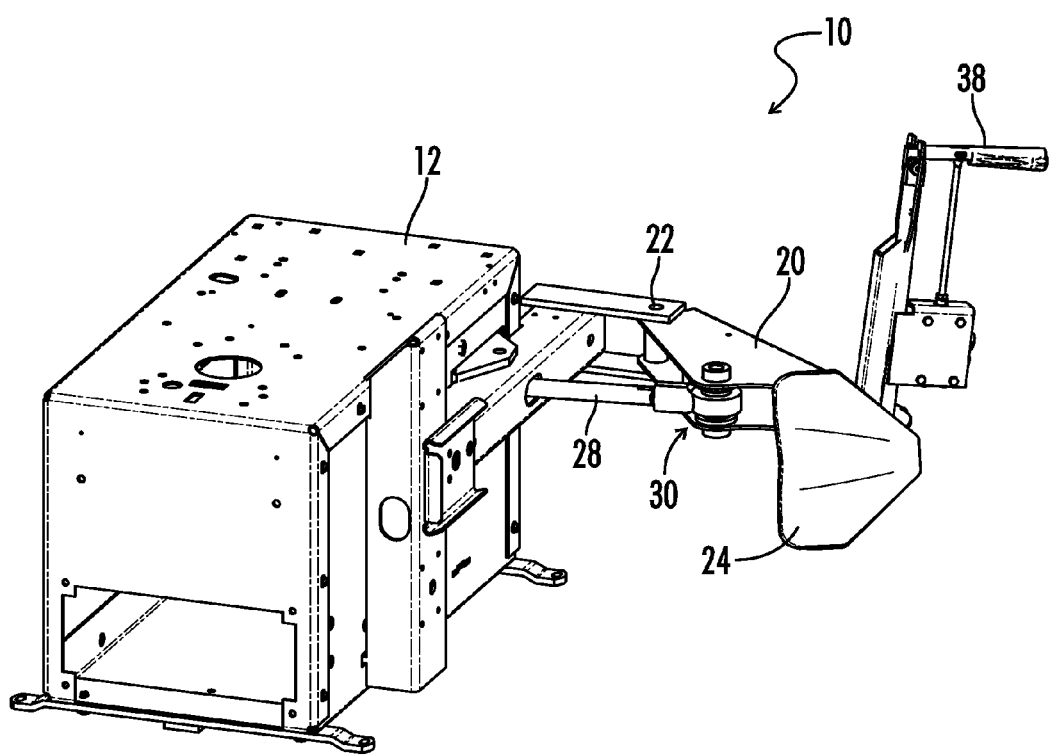
FIG. 4 is a perspective view of an embodiment of a tire changing machine having a ball joint between the bead loosener arm and the actuator rod.
Figure 5:
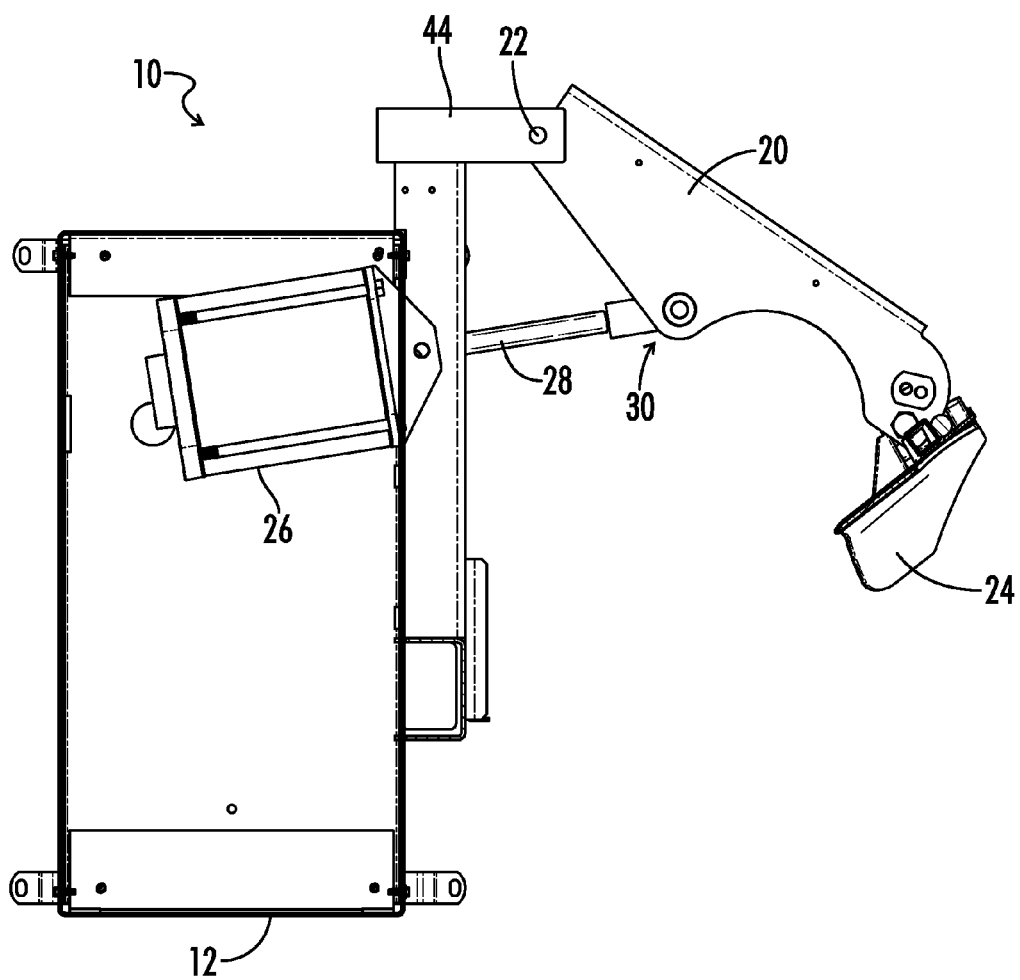
FIG. 5 is a top view of an embodiment of a tire changing machine having a ball joint between the bead loosener arm and the actuator rod.

As seen in FIG. 4, in some embodiments, movement of bead loosener arm 20 toward base 12 is achieved using an actuator having an actuator rod 28. A handle 38 may also be positioned on bead loosener arm 20 to manually position bead loosener arm 20 in some embodiments. In some embodiments, controls for operating the actuator are positioned on handle 38, as seen in FIG. 4. An actuator rod 28 extends from base 12 and is coupled to bead loosener arm 20 at a pivoting joint 30. Pivoting joint 30 provides a linkage between the actuator rod 28 and bead loosener arm 20. As seen in FIG. 5, actuator 26 may be housed within base 12 such that actuator rod 28 extends from base 12 toward. Actuator 26 includes any suitable actuator such as a powered cylinder, a hydraulic actuator, a pneumatic actuator, a powered linear stage, or any other suitable actuator for applying a force against bead loosener arm 20 such that shoe 24 may engage a tire sidewall. In some embodiments, a bead loosener arm frame 44 is positioned on the side of base 12, and bead loosener arm 20 is pivotally attached to the frame 44 at a pivoting arm joint 22. In alternative embodiments, bead loosener arm 20 is pivotally attached to base 12.

Figure 6:
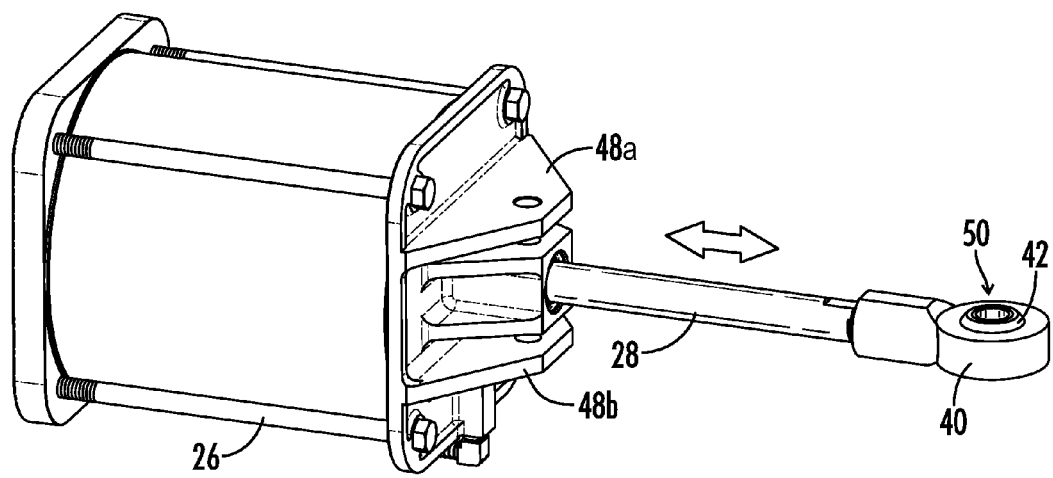
FIG. 6 is a perspective view of an embodiment of an actuator having a ball joint disposed at the actuator rod end.

Pivoting joint 30 includes a ball joint 50 in some embodiments. The ball joint 50 includes a socket 40 and a ball 42 disposed in socket 40, as seen in FIG. 6. The ball joint 50 is positioned on the end of actuator rod 28 in some embodiments. Actuator 26 also includes upper and lower actuator mounts 48a, 48b for mounting actuator 26 to base 12 in some embodiments. Actuator 26 is pivotally attached to base 12 in some embodiments to allow rotation of actuator 26 relative to base 12 because the travel range of bead loosener arm 20 causes the angle of orientation of actuator rod 28 to change during motion of bead loosener arm 20. Actuator rod 28 is moveable across a range of linear motion.

Figure 7:
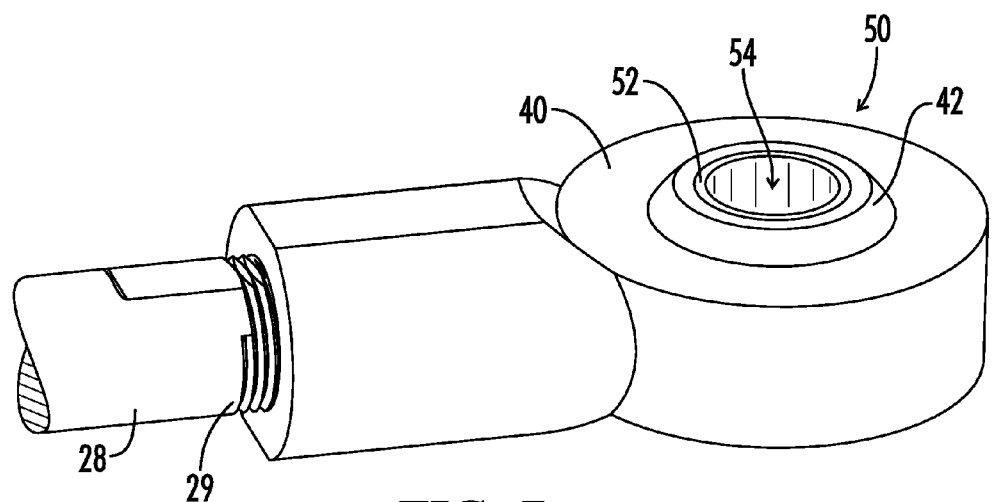
FIG. 7 is a detail perspective view of an embodiment of a ball joint at the actuator rod end.

Referring to FIG. 7, an embodiment of a ball joint 50 is shown. Ball joint 50 includes a socket 40 and a ball 42 positioned at least partially in socket 40. Ball 42 is generally rotatable relative to socket 42. Ball 42 includes a truncated sphere in some embodiments, as seen in FIG. 7. A passage is defined through ball 42 in some embodiments. The passage in ball 42 allows a fastener to be inserted through ball 42 to secure the ball joint to a structure such as bead loosener arm 20. In some embodiments, a ball joint bushing 52 is disposed in the passage in ball 42. Ball joint bushing 52 is pivotable relative to ball 42 in some embodiments. Ball 42 includes a passage 54 defined through ball 42. Ball joint bushing 52 is installed in passage 54 in ball 42 in some embodiments. Ball joint bushing 52 provides a passage for a fastener such as a pin to secure ball joint 50 to bead loosener arm 20 in some embodiments. Ball joint bushing 52 provides a bearing surface between a fastener and ball 42 in some embodiments. Socket 40 is positioned on the actuator rod end 29 extending toward bead loosener arm 20 in some embodiments. Socket 40 may be secured to actuator rod end 29 in either a fixed or a selectively removable configuration in various embodiments. In some embodiments, socket 40 is threaded onto the actuator rod end 29.

Figure 8:
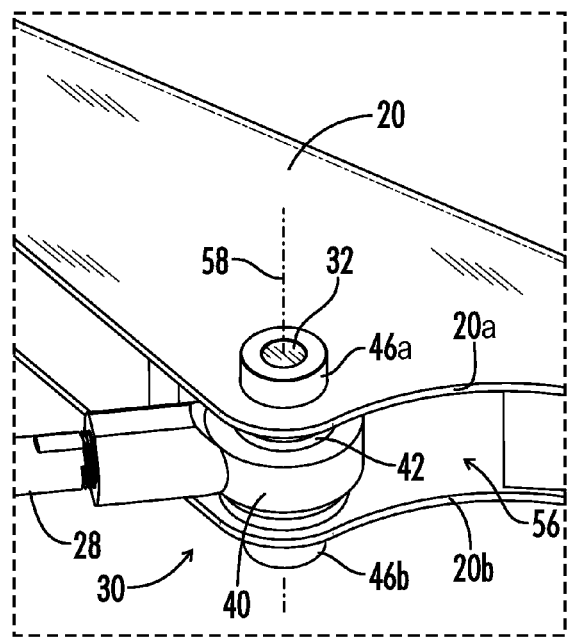
FIG. 8 is a detail perspective view of an embodiment of a ball joint between a bead loosener arm and an actuator rod.
Figure 9:
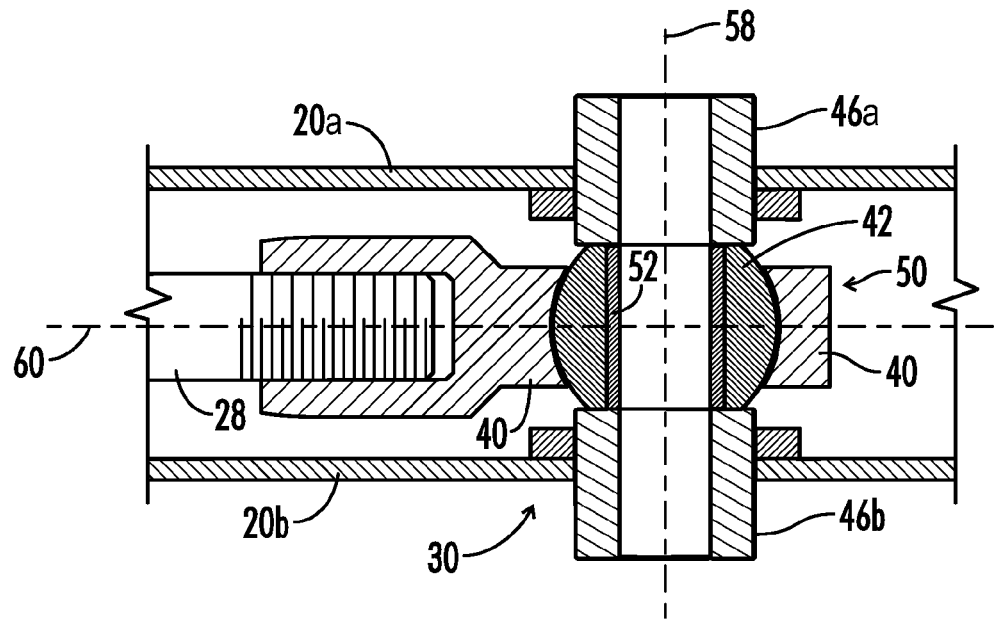
FIG. 9 is a partial cross-sectional view of an embodiment of a ball joint between a bead loosener arm and an actuator rod having a first angular orientation in a minor vertical plane.
Figure 10:
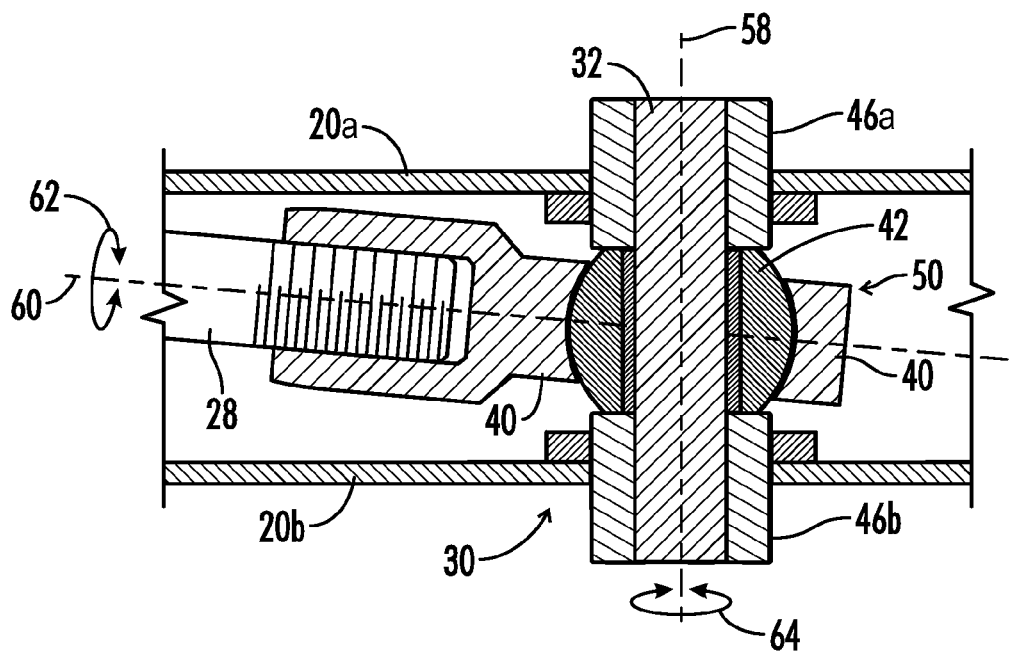
FIG. 10 is a partial cross-sectional view of an embodiment of a ball joint between a bead loosener arm and an actuator rod having a second angular orientation in a minor vertical plane.

Referring to FIGS. 8-10, an embodiment of a pivoting joint 30 having a ball joint 50 is shown. Socket 40 is located on the end of actuator rod 28, and the pivoting joint 30 is positioned in a space 56 between an upper bead loosener arm member 20a and a lower bead loosener arm member 20b in some embodiments. A pivoting joint 30 includes a socket 40 and a ball 42 positioned in the socket 40. The ball 42 is secured to the bead loosener arm 20 using a fastener 32 such as a pin inserted through a passage in the ball 42. In some embodiments, as seen in FIG. 9, a ball joint bushing 52 is positioned in a passage in ball 42. An upper arm bushing 46a is disposed on upper bead loosener arm member 20a, and a lower arm bushing 46b is disposed on lower bead loosener arm member 20b in some embodiments. Upper and lower arm bushings 46a, 46b are coaxially aligned with the passage in ball 42 along a joint pivot axis 58 in some embodiments. The continuous axial passage along joint pivot axis 58 provides a space for placement of a fastener such as a pin to secure the ball joint to the bead loosener arm 20.

Fastener 32 extends through upper and lower arm bushings 46a, 46b, and also through the passage in ball 42, and specifically through the passage in ball joint bushing 52, in some embodiments. Upper arm bushing 46a is rigidly secured to upper bead loosener arm member 20a, and lower arm bushing 46b is rigidly secured to lower bead loosener arm member 20b in some embodiments. As such, fastener 32 in the form of a pin inserted through upper and lower arm bushings 46a, 46b provides a structure about which ball 42 may pivot during use. Fastener 32 may be secured between upper and lower arm members 20a, 20b on bead loosener arm 20 in a rigid or fixed configuration. In other embodiments, fastener 32 is selectively removable from the bead loosener arm 20. Fastener 32 may be secured in place using any suitable mechanical linkage such as a threaded connection, an interference fit, a flanged end, a locking pin, or any other suitable structure. In further embodiments, fastener 32 may be pivotable relative to upper and lower arm bushings 46*a*, 46*b*.

Socket 40 is generally moveable around ball 42. During use, actuator rod 28 is generally pulled along a rod axis 60 in a pulling direction. The pulling direction of rod 28 is generally perpendicular to the joint pivot axis 58 in some applications. However, during use, the rod axis 60, or pulling direction, may change slightly in a vertical plane due to forces encountered during movement of bead loosener arm 20, as seen in FIG. 10. Ball joint 50 provides an improved linkage between actuator rod 28 and bead loosener arm 20 by allowing additional degrees of freedom of actuator rod 28 in at least one vertical plane, as shown by the change in angle of rod axis 60 relative to joint pivot axis 58 in FIGS. 9 and 10. Ball joint 50 allows actuator rod end to pivot both in a major plane of rotation substantially parallel to the movement of the bead loosener arm 20 as well as in minor vertical planes.

Ball joint 50 provides a first degree of freedom in that socket 40 is generally pivotable about joint pivot axis 58 along a major plane of bead loosener arm travel, as shown by arrows 64 in FIG. 10. Ball joint 50 provides a second degree of freedom along the minor vertical plane defined by joint pivot axis 58 and rod axis 60 in some embodiments. Ball joint 50 also provides a third degree of freedom along a second minor vertical plane allowing socket 40 to rotate relative to ball 42 about rod axis 60, as indicated by arrows 62 shown in FIG. 10 in some embodiments. As such, pivoting joint 30 of the present invention provides an improved linkage between actuator rod 28 and bead loosener arm 20 to provide additional degrees of freedom of pivoting movement. The improved pivoting joint 30 allows stress distribution in directions other than along the major plane of bead loosener arm travel, and provides stress distribution generally in the axial direction along joint pivot axis 58 in some embodiments. Improved pivoting joint 30 also provides improved Thus, although there have been described particular embodiments of the present invention of a new and useful Tire Changing Machine with Bead Loosener Arm, it is not intended that such references be construed as limitations upon the scope of this invention except as set forth in the following Claims.

What is claimed is:

1. A wheel servicing apparatus, comprising:
a machine base;
a bead loosener arm pivotally coupled to the machine base; and
an actuator attached to the machine base, the actuator including an actuator rod having an actuator rod end joined to the bead loosener arm at a ball joint, the ball joint having at least three angular degrees of freedom.

2. The apparatus of claim 1, wherein the pivoting joint is configured to allow the actuator rod end to pivot in a major plane of rotation substantially parallel to movement of the bead loosener arm and in at least one minor vertical plane.

3. The apparatus of claim 1, wherein the ball joint includes a ball and a socket, the socket attached to the actuator rod.

4. The apparatus of claim 3, further comprising:
a passage defined through the ball; and
a pin positioned in the passage, wherein the pin secures the ball joint to the bead loosener arm.

5. The apparatus of claim 4, further comprising a ball joint bushing disposed in the passage, wherein the pin extends through the ball joint bushing.

6. The apparatus of claim 5, wherein the ball joint bushing is pivotable relative to the pin.

7. The apparatus of claim 6, wherein the pin is selectively removable from the bead loosener arm.

8. The apparatus of claim 5, wherein the pin is fixed relative to the ball joint bushing and the bead loosener arm.

9. The apparatus of claim 8, wherein the ball joint bushing is pivotable relative to the ball.

10. The apparatus of claim 5, further comprising an arm bushing disposed on the bead loosener arm co-axially aligned with the ball joint bushing, wherein the pin is positioned in both the ball joint bushing and the arm bushing.

11. The apparatus of claim 10, wherein the arm bushing is pivotable relative to the bead loosener arm.

12. The apparatus of claim 10, wherein the arm bushing is fixed relative to the bead loosener arm.

13. The apparatus of claim 10, wherein the pin is selectively removable from the arm bushing.

14. The apparatus of claim 10, wherein the pin is fixed relative to the arm bushing.

* * * * *